United States Patent [19]

Sarah

[11] 4,167,828
[45] Sep. 18, 1979

[54] SPIN CASTING REEL ASSEMBLY

[75] Inventor: Thomas F. Sarah, Akron, Ohio

[73] Assignee: Reuben L. Emerson, Akron, Ohio

[21] Appl. No.: 765,071

[22] Filed: Feb. 3, 1977

[51] Int. Cl.$^2$ .................... A01K 89/00; A01K 89/02
[52] U.S. Cl. ................... 43/20; 242/84.2 A; 242/84.5 R
[58] Field of Search ......... 43/20; 242/84.2 R, 84.2 A, 242/84.2 B, 84.5 R

[56] References Cited

U.S. PATENT DOCUMENTS

| | | | |
|---|---|---|---|
| 2,299,156 | 10/1942 | Lind | 43/20 |
| 2,746,695 | 5/1956 | Clay | 242/84.2 B |
| 2,752,717 | 7/1956 | Lind | 43/20 |
| 3,074,664 | 1/1963 | Beger | 242/84.5 R X |
| 3,105,650 | 10/1963 | Kuether | 242/84.2 A |
| 3,948,465 | 4/1976 | Scusa | 242/84.5 R X |

*Primary Examiner*—Russell R. Kinsey
*Assistant Examiner*—Daniel J. Leach
*Attorney, Agent, or Firm*—Oldham, Oldham, Hudak & Weber

[57] ABSTRACT

A spin casting fishing reel assembly is presented wherein actuation of the reel and feathering of the fishing line leaving the reel may both be accomplished at a single point forwardly of the reel itself. Fundamentally, the invention consists of a casing maintaining therein a spool about which the fishing line is wound. A tubular handle is connected to a front end portion of the casing with the fishing line leaving the reel and passing through the tubular handle. The handle includes an outer tubular member having an inner tubular member slidingly received therein. A spring-biased slide button is connected to the inner tubular member and rearward motion of the slide button by the user's thumb causes the inner tubular member to engage a cam maintained within the casing. This cam causes a retraction of a carrier pin to allow the line to be released from the spool, through the tubular handle, and across the slide button. An eccentric washer is maintained upon a shaft for engagement with a pin holder to cause the projection of the carrier pin when the line is to be retrieved. A pinion is maintained about the shaft with the pinion being in engagement with a crank and gear assembly. A brake or drag housing is presented as an extension of the pinion and maintains therein a first brass washer eared to the housing, a second brass washer secured to the shaft, and at least one leather washer interposed between the two. A plunger is interconnected with a threaded rod and an adjustment knob and in contacting engagement with the first brass washer. Adjustment of the knob regulates the frictional engagement experienced among the washers of the brake and thus controls the drag adjustment of the reel assembly. The shaft, brake, adjustment rod, and knob are all axially aligned with the knob protruding from the casing at a point rearwardly of an arc defined by the rotation of the crank.

21 Claims, 2 Drawing Figures

SPIN CASTING REEL ASSEMBLY

BACKGROUND OF THE INVENTION

This invention deals in the art of spin casting reels for game fishing. Heretofore, numerous types of spin casting reels have been developed for utilization by those participating in the outdoor sport of fishing. While each of the previously known reels have their own particular attributes distinguishing them over other reels, there still remains within the art a number of inherent drawbacks common to all prior reels which make even the most sophisticated of them of limited utility. For instance, in the prior art, it has been known that it is most desirable for the user to be able to feather the line as the same leaves the reel by means of frictional engagement of a thumb or finger upon the line. While U.S. Pat. Nos. 2,746,695; 2,752,717; and 3,419,992, teach such a capability, these prior art teachings fail to position the reel actuation mechanism at the point where the feathering is to be achieved.

Most known reel assemblies include a drag or brake mechanism which may be adjusted by the user to allow for release of line from the spool when a particular amount of tensional force is applied to the line, for instance, by a "running" fish. However, known reel assemblies position the drag adjustment mechanism upon or in close proximity to the crank, making it virtually impossible to adjust the drag with a "running" fish on the line. Further, known mechanisms are generally offset with respect to the reel assembly carrier and hence adjustment of the same is achieved through complex mechanical linkages subject to wear and failure.

Many types of carrier pin actuation mechanisms have been known for protruding or retracting the carrier pin for respectively engaging or releasing the line. Prior known mechanisms have required complex mechanical linkages to interconnect the carrier with a carrier actuation device positioned rearwardly thereof. Again, it has been found that such mechanical linkages are subject to wear and subsequent failure, particularly in light of the outdoor environment in which such assemblies are used.

Yet further, it has been known that reel assemblies preferably include a housing or cover plate which may be removed for purposes of inspecting, repairing and maintaining the reel assembly mechanism. In known devices, access to the interior of the reel assembly is made by means of the utilization of a tool such as a screwdriver, wrench or the like, and the cover or housing is completely removed from the assembly proper such that the dropping or loss of the same becomes an ever present hazard.

OBJECTS OF THE INVENTION

In light of the foregoing, it is an object of the instant invention to present a spin casting reel assembly wherein actuation and control of the reel assembly and the feathering of the line leaving the same may both be accomplished at a single point, that point being positioned forwardly of the reel itself.

It is a further object of the invention to present a spin casting reel assembly wherein the drag adjustment mechanism is positioned rearwardly of the reel itself and out of the way of the crank handle to allow for easy drag adjustment even when the user has a "running" fish on the line.

Still another object of the invention is to present a spin casting reel assembly wherein the drag mechanism is positioned in line with the carrier so that no complex linkage is necessary and the drag adjustment may be smoothly made.

Yet a further object of the invention is to present a spin casting reel assembly wherein cam actuation of an eccentric carrier is achieved forwardly of the reel itself in order to affect retraction of the carrier pin allowing for casting.

Another object of the invention is to present a spin casting reel assembly wherein cam actuation of an eccentric carrier is achieved by means of the reel crank to actuate the carrier pin for engagement with the line for rewinding.

Still a further object of the invention is to present a spin casting reel assembly wherein a rearward portion of the housing thereof is hingedly connected to a forward portion and easily released by means of a single thumb screw, thus providing for easy access to the interior of the reel itself.

Yet another object of the invention is to present a spin casting reel assembly which is relatively simplistic in design, reliable in operation, easily used by both the experienced and novice fisherman, and comprising elements making it competitively priced.

SUMMARY OF THE INVENTION

The foregoing objects and other objects of the invention which will become apparent as the detailed description proceeds are achieved by a spin casting fishing reel assembly, comprising: a casing having a spool therein for receiving fishing line, said spool being maintained about a rotatable shaft; a tubular handle connected to a front end portion of said casing, said fishing line passing from said spool and through said tubular handle; actuation means at an end of said tubular handle for enabling the release of said fishing line from said spool, said fishing line passing from said tubular handle and over said actuation means; a pinion positioned about said shaft and in regulatable rotational engagement therewith; a crank gear in rotational engagement with said pinion and connected to a crank rotatably connected to said casing; a brake interconnected between said shaft and pinion, said brake being axially aligned with said shaft; and brake adjustment means axially aligned with said brake and shaft and connected to said brake for regulating the rotational engagement between said pinion and shaft.

DESCRIPTION OF THE DRAWINGS

For a complete understanding of the objects and structure of the invention, reference should be had to the following detailed description and accompanying drawings wherein.

DETAILED DESCRIPTION OF THE PREFERRED EMBODIMENT

Figure 1:
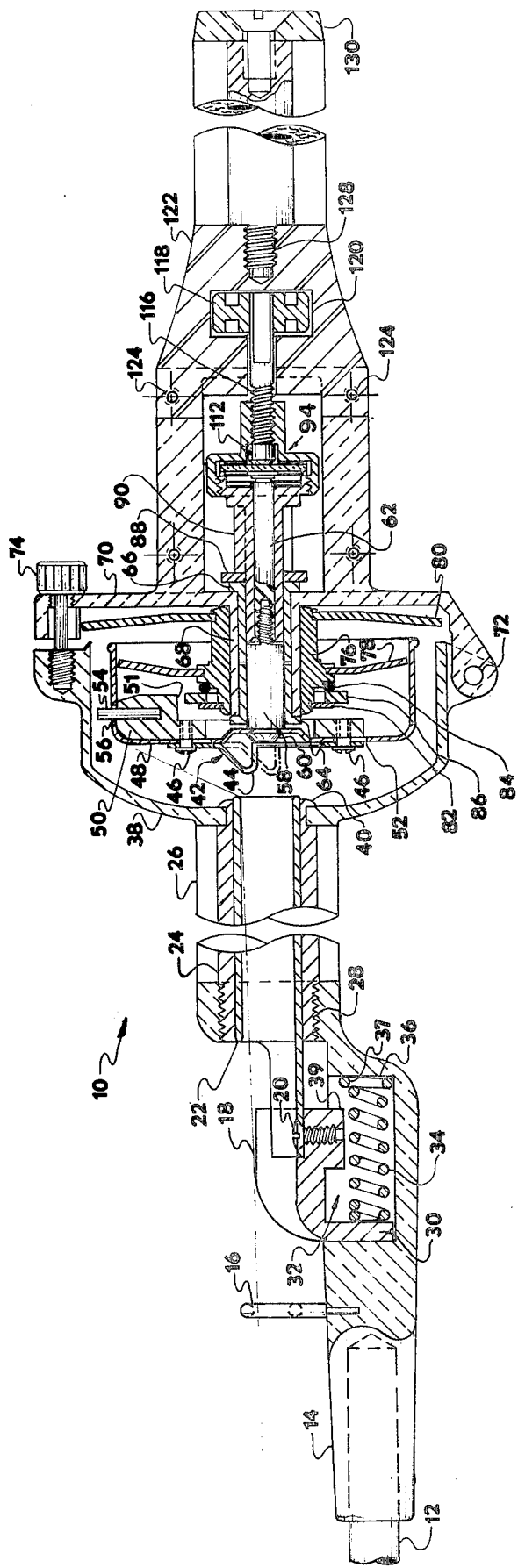
FIG. 1 is a cross-sectional view of the spin casting reel assembly of the invention.

Referring now to the drawings and more particularly FIG. 1, it can be seen that the spin casting reel assembly of the invention is designated generally by the numeral 10. Connected to the assembly 10 and extending therefrom is a rod tip assembly 12 which may be of any suitable nature as is accepted in the art. Such rods are generally comprised of a fiber glass or flexible wood construction and are of a length determined by the preferences of the user. In the preferred embodiment shown in FIG. 1, the rod tip assembly 12 extends in parallel relationship below the longitudinal axis of the reel assembly 10. The rod assembly 12 is secured by a handle frame 14 in any appropriate manner not deemed to be essential to the teachings of the instant invention. A line guide 16 is connected to the handle frame 14 and has therein an opening encircling the horizontal axis of the reel assembly 10 for receiving and guiding the fishing line as it passes from the assembly 10 and to the tip of the rod tip assembly 12.

A slide button 18 is secured by means of a screw or other fastener 20 to an inner tubular member 22 which is received in sliding engagement within an outer tubular member 24. Secured about the member 24 is an appropriate grip covering which is preferably of cork or other material providing for a secure grip by the user's hand. Indeed, the assembly comprising inner and outer tubular members 22,24 and covering 26 comprise a handle by which a fisherman utilizing the invention secures the rod and reel assembly. This handle is fastened to the handle frame 14 by means of threaded engagement of the handle frame 14 with the outer tubular member 24 as at 28.

As discussed directly above, the inner tubular member 22 is received in sliding engagement within the outer tubular member 24. Such sliding is achieved by the user applying force with his thumb upon the slide button 18 to draw the same rearwardly toward the main body of the reel assembly 10. The slide button 18 may be knurled or grooved to facilitate such force-imparting engagement by the user's thumb. As can be seen in FIG. 1, the slide button 18 has a depending front end portion 30 which falls within a cavity 32 defined by the structure of the handle frame 14. A spring 34 is maintained within the cavity 32 in separating engagement between the depending end 30 of the slide button 18 and the rear wall 36 of the cavity 32. The spring 34 is functional to bias the slide button 18, and hence the inner tubular member 22, away from the main body of the reel assembly 10 as shown in FIG. 1.

The end coil 37 of the spring 34 is preferably of a larger diameter than the remaining coils such that it may be contacted by the surface 39 of the slide button 18 when the latter is slid to its most rearward position. As will become apparent hereinafter, this contacting engagement results in a clicking discernible to both the user's ear and the touch of his thumb such that he may be advised that the reel is prepared for casting.

The outer tubular member 24 is secured to a cone 38 by an appropriate securing technique as at 40. This cone 38 provides a front end portion of the housing of the reel assembly 10. Maintained within and protected by the cone 38 is a cam 42 having a cam surface 44 thereon. The cam 42 is secured by means of screws or other fasteners to a pin holder 50, the screws 46 passing through enlarged slots 52 within a carrier 48. A carrier pin 54 is secured to the pin holder 50 and passes through an opening 56 within the carrier 48. The slots 52 are of such length as to exceed the diameter of the screws 46 by an amount equivalent to the maximum protrusion of pin 54 through the opening 56 of the carrier 48.

A carrier shaft 58 is centrally located within the cone 38 and maintained along the horizontal axis of the reel assembly 10. The carrier shaft 58 is preferably in alignment with the center line of the tubular member 22 and is supported by means to be discussed hereinafter. The carrier 48 is fixedly secured to the carrier shaft 58 by means of a screw or other securing element 60. Suffice it to say at this time that the carrier shaft 58 is connected to and rotated by the brake shaft 62 which is in turn controlled by a pinion and drag brake assembly to be discussed hereinafter. Such rotation is smoothly achieved upon the carrier shaft bearing 64 and the brake shaft bearing 66. The bearings 64, 66 are themselves received within a tubular shaft 68 comprising a portion of the rear housing 70; such housing being pivotally connected to the cone 38 as at 72 and threadedly connected thereto as by means of the screw 74. Preferably, the screw 74 is knurled to facilitate finger threading of the screw into the cone 38.

With continued reference to FIG. 1, it can be seen that the spool hub 76 is secured about the tubular shaft 68. This hub 76 receives, in secured engagement, a front flange 78 and rear flange 80. The combination of the flanges 78,80 and the spool hub 76 define a spool for maintaining the fishing line thereabout. It should be readily appreciated that the hub 76 and flanges 78,80 are stationary elements secured to the tubular shaft 68.

Received and maintained about the front portion of the spool hub 76 is a spool washer 82. An "O" ring or other suitable elastic frictional element 84 is circumferentially provided about the hub 76. A sliding washer 86 is provided in frictionally-sliding engagement between the washer 82 and the "O" ring 84. The elastic nature of the "O" ring 84 provides for such frictional engagement. It should be noted that the sliding washer 86 is quite loosely fitted upon the hub 76 with the play of the washer 86 about the hub 76 being substantially equivalent to the maximum protrusion of the carrier pin 54 through the opening 56.

Figure 2:
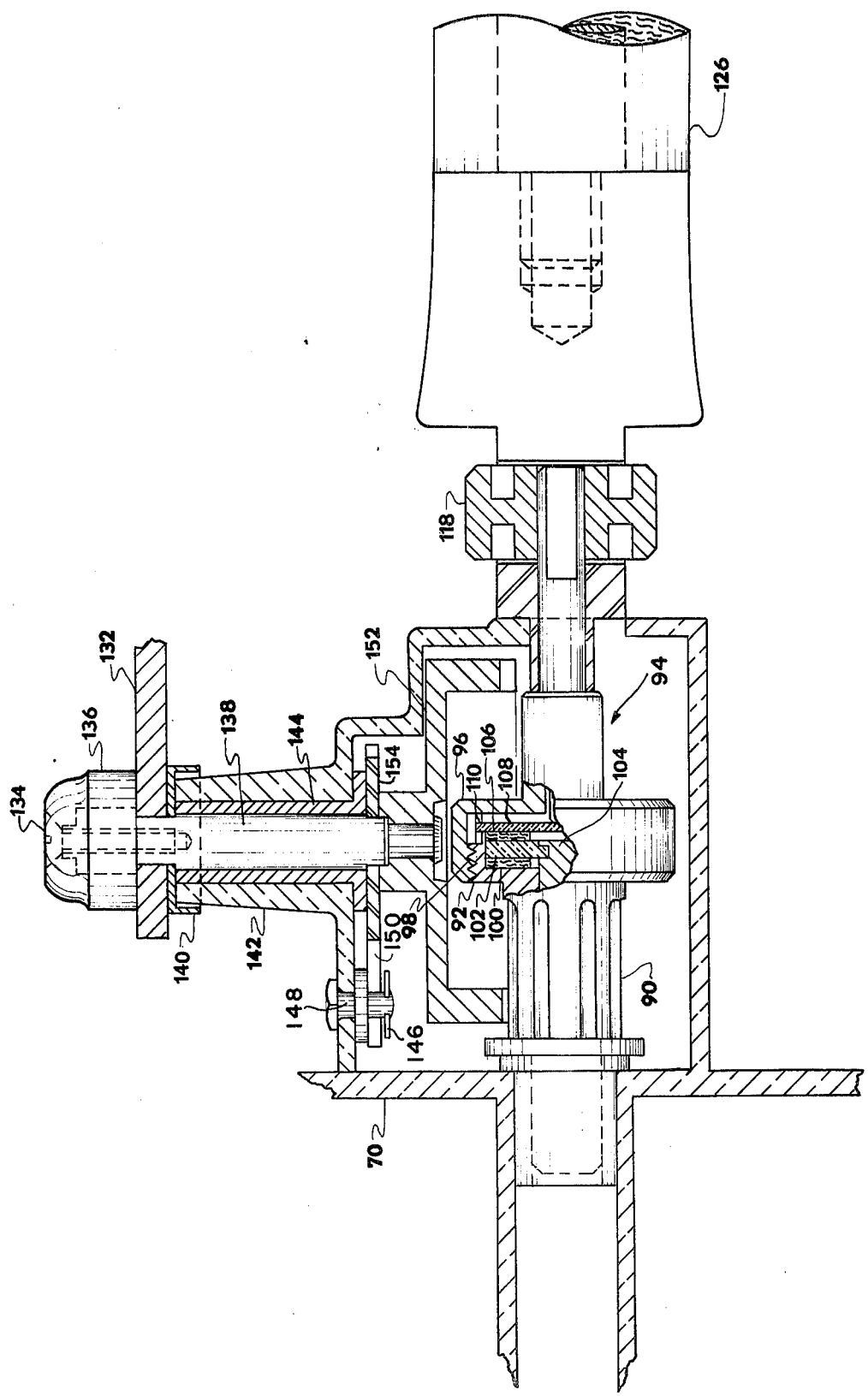
FIG. 2 is a sectional view of the pinion and crank assembly utilized with the structure of FIG. 1.

A pinion washer 88 is interposed between the brake shaft bearing 66 and the pinion 90. The pinion 90 is preferably molded as an integral part of the front housing 92 of the drag assembly 94. A back housing 96 of the drag assembly 94 is secured, as by threads 98, to the front housing 92. Maintained within the cavity defined by the housings 92,96 is a leather washer 100 adjacent the front housing 92 and encompassing the brake shaft 62. A brass washer 102 is keyed as at 104 to the brake shaft 62. Next, another leather washer 106 is positioned such that the washer 102 is sandwiched between the leather washers 100,106. A brass washer or disk 108 is next eared to the brake housing 92,96 as at 110. A plunger 112, preferably of neoprene construction, is positioned in contacting engagement with the washer 108 and maintained within a cavity 114 of the rear housing 96. The washer 100–108 may be compacted into tight frictional engagement by means of a threaded adjustment rod 116 in engagement with the plunger or plug 112. A knob 118, secured to the rod 116, is operative, under rotational movement by the user, to adjust the frictional engagement of the various washers 100–108. It should be noted that the knob 118 protrudes from an opening 120 within a guard section 122 secured to the rear housing 70 by screws or the like such as at 124. It should further be noted that the knob 118 and its associated adjustment rod 116 are directly in line with the drag assembly 94 which is in turn in line with the brake shaft 62 and carrier shaft 58. Yet further, the knob 118 is positioned rearwardly of the pinion 90 and out of the way of the crank handle as shown in FIG. 2 and discussed hereinbelow. A handle extension 126 is preferably secured as by threaded engagement as at 128 to the guard 122. The handle extension 126 may have an enlarged end 103 which many fishermen find to be preferential for resting the end of the rod against their waist, belt, or the like.

With reference now to FIG. 2, it can be seen that a crank 132 is secured by means of a lock screw 134 and a crank nut 136 to a gear shank 138. A cup 140 is interposed between the crank 132 and a cover plate 142 with a bearing 144 being maintained within the tubular portion of the cover plate 142 and circumferencing the gear shank 138. A pawl and ratchet assembly comprising a ratchet 154, pawl washer 146, pawl pivot 148, and pawl 150 is provided in mechanical engagement with the shank 138 to limit the direction of rotation of the crank to a line-winding mode of operation. Of course, a gear 152 is secured to the shank 138; the gear 152 making rotational engagement with the pinion 90.

OPERATION

With an understanding of the foregoing structure of the invention, consideration is now given to the operation of the same. The user secures the rod and reel assembly by placing his hand about the grip 26. His thumb rests upon the slide button 18 with the fishing line coming from the spool 76-80 through the tubular member 22 and between his thumb and the button 18. To prepare for casting, the button 18 is slid rearwardly against the biasing of the spring 34 to slide the inner tubular member 22 into contacting engagement with the cam surface 44 of the cam 42. As shown in FIG. 1, such action will force the cam 42 downwardly to the position shown in phantom with the consequent movement of the pin carrier 50 thus retracting the pin 54 through the opening 56. It should be readily appreciated that the retraction of the pin 54 is provided for by the movement allowed by the slots 52 through which pass the securing screws 46. It should, of course, be appreciated that the screws 46 are tightened to such an extent as to allow frictional movement of the cam 42 and pin carrier 50 upon the carrier 48.

With the pin 54 retracted, the rod and reel assembly is ready for casting of the line. The user lifts the rod upwardly with the tip of the rod somewhat behind him and then begins his forward casting motion in normal fashion. During this time, the line is held secure between the slide button 18 and the user's thumb. When the user reaches a point in his casting motion at which de desires to release the line, his thumb is slightly lifted. The slide button 18 slides forward under the urging of the sping 34 and the line then passes between his thumb and the button 18 with the user having a feathering control over the line via his thumb. Thus, if the force of the cast has been too great and the lure or other hook means at the end of the line may be seen to be overshooting the mark, the user may feather the line with thumb contact to drop the lure at the desired point.

With the cast having been completed in the manner aforementioned, it should be appreciated that the sliding washer 86 is eccentrically located about the spool hub 76. This eccentricity is due to the fact that the movement of the cam 42 and pin carrier 50 by contact of the tubular member 22 with the cam surface 44 has caused the surface 51 of the pin carrier 50 to come in contact with the sliding washer 86 and offset it with respect to the hub 76.

To retrieve the line, the user need only to rotate the crank 132 thus turning the gear 152 and the pinion 90. Assuming that the drag 94 is so adjusted as to provide for rotation of the brake shaft 62, the carrier shaft 58 and the carrier 48 are thus rotated. As the carrier 48 rotates, the surface 51 of the pin carrier 50 comes into contact with the protruding side of the sliding washer 86 which is firmly held in sliding engagement between the washer 82 and the "O" ring 84. The sliding washer 86 thus serves as a cam surface upon which the surface 51 rides to move the pin carrier 50 upon the carrier 48 and thus project the pin 54 for retrieving engagement with the line. Of course, when this projecting action takes place, the cam 42 is again positioned in such a manner as to be capable of being actuated by sliding of the tubular member 22.

The drag assembly 94 is provided as in most reel assemblies, to alleviate the danger of snapping of the line when a fish is caught. As was noted above, the housing of the drag assembly 94 is fixedly secured to or is part and parcel of the pinion 90. Further, the washer 108 is eared or lugged to this housing such that the washer 108 rotates with the pinion 90. Similarly, the washer 102 is fixedly secured to the brake shaft 62 which is in turn connected to the carrier shaft 58. Thus, the rotation of the carrier 48 under control of the pinion 90 is dependent upon the frictional engagement achieved between and among the various washers of the assembly 94. If the frictional engagement is slight, as per adjustment of the knob 118, the line-retracting capability of the reel assembly 10 will correspondingly be slight and the possible tension within the line will be minimized in that slippage between the carrier and pinion will be experienced. Similarly, if the frictional engagement among the washers is great as per adjustment of the knob 118, slippage between the pinion and carrier will be minimized and the line-retracting capabilities of the pin 54 will be maximized. However, such a situation, with little or no slippage in the drag, will allow for the undesirable possibility oof tensions within the line reaching the snapping point.

Often times, it is desirable to adjust the drag of a fishing reel when there is a fish on the line. Such is readily achieved with the instant invention wherein the knob 118, positioned rearwardly of the crank 132, may be easily accessed. When there is a fish on the line, putting a rotational force on the brake shaft 62, or when the crank 132 is held to secure the pinion 90, the knob 118 may be adjusted to set the drag. This drag is infinitely variable and it has been found to be smoothly adjustable by virtue of its in-line carrier and the utilization of the recited washer combinations.

As briefly mentioned above, the screw 74 and pivot point 72 allow for ready acces to the interior of the reel assembly 10 while maintaining the same as a unit. By releasing the screw 74 and pivotally separating the rear housing 70 from the cone 38, such access may be made for purposes of inspection, maintenance, and repair.

Thus, it can be seen that the objects of the invention have been achieved by the structure presented hereinabove. While certain specific materials and combinations of elements have been recited for use in the invention, it is to be understood that many variations on the basic theme of the invention may be had without deviating from the novel concepts thereof. While in accordance with the patent statutes only the best mode and preferred embodiment of the invention has been presented and described in detail, it is to be understood that the invention is neither limited thereto nor thereby. Consequently, for an appreciation of the true scope and breadth of the invention, reference should be had to the following claims.

What is claimed is:

1. A spin casting reel assembly, comprising:
   - a casing having a front end portion and a rear end portion and having a spool therein for maintaining fishing line;
   - a handle connected to said front end portion of said casing, said handle including an outer tubular member secured to said front end portion and an inner tubular member slidingly received within said outer tubular member; and
   - actuation means connected to said handle for enabling the release of said fishing line from said spool, said fishing line passing from said front end portion and over said actuation means.

2. The spin casting reel assembly as recited in claim 1 wherein said fishing line passes through said inner tubular member.

3. The spin casting reel assembly as recited in claim 1 wherein said actuation means comprises a button connected to said inner tubular member, said button being slideable between two points and being in engagement with biasing means for biasing said button toward one of such points.

4. The spin casting reel assembly as recited in claim 1 in which further includes:
   - a carrier shaft maintained within said casing;
   - a carrier affixed to and rotatable with said carrier shaft;
   - a pin holder having a pin connected thereto for selective engagement with said fishing line; and
   - a cam connected to said pin holder, said cam and pin holder being slidingly mounted upon said carrier and movable between two positions thereon.

5. The spin casting reel assembly as recited in claim 4 wherein said carrier has at least two slots therein, said pin holder and cam being interconnected through said slots and on opposite sides of said carrier.

6. The spin casting reel assembly as recited in claim 4 wherein one end of said inner tubular member is connected to said actuation means and another end thereof is in selective contacting engagement with said cam.

7. The spin casting reel assembly as recited in claim 1 wherein said front end portion and rear end portion of said casing are hingedly connected to each other.

8. In a spin casting fishing reel, havng a casing with a spool therein for receiving fishing line, the spool being maintained about a rotatable shaft, a pinion mounted about the shaft and in regulatable rotational engagement therewith, and a crank gear in rotational engagement with the pinion and connected to a crank rotatably mounted to the casing, the improvement, comprising:
   - a brake interconnected between the shaft and pinion, said brake being axially aligned with said shaft and comprising: a housing fixedly secured to the pinion; a first frictional member maintained within and connected to said housing; and a second frictional member maintained within said housing and connected to the shaft; and
   - brake adjustment means axially aligned with said brake and the shaft and connected to said brake for regulating the rotational engagement between the pinion and shaft, and comprising: a plunger in contacting engagement with said first frictional member; an adjustment rod in contacting engagement with said plunger; and a knob, axially aligned with the shaft and extending from a rear portion of the casing, said knob being connected to said rod.

9. The improvement in a spin casting fishing reel according to claim 8 wherein said first and second frictional members are of a metal composition and are separated by a leather washer.

10. The improvement in a spin casting fishing reel according to claim 8 which further includes a handle extension secured to an end of the casing and rearwardly of said brake adjustment means.

11. A spin casting fishing reel assembly, comprising:
    - a casing having a spool therein for receiving fishing line, said spool being maintained about a rotatable shaft;
    - a tubular handle connected to a front end portion of said casing, said fishing line passing from said spool and through said tubular handle;
    - actuation means at an end of said tubular handle for enabling the release of said fishing line from said spool, said fishing line passing from said tubular handle and over said actuation means;
    - a pinion positioned about said shaft and in regulatable rotational engagement therewith;
    - a crank gear in a rotational engagement with said pinion and connected to a crank rotatably connected to said casing;
    - a brake interconnected between said shaft and pinion, said brake being axially aligned with said shaft; and
    - brake adjustment means axilly aligned with said brake and shaft and connected to said brake for regulating the rotational engagement between said pinion and shaft.

12. The spin casting fishing reel assembly as recited in claim 11 wherein said tubular handle includes an inner tubular member slidingly received within an outer tubular member, said outer tubular member being connected to said casing and said inner tubular member being connected to said actuation means.

13. The spin casting fishing reel assembly as recited in claim 12 wherein said actuation means comprises a spring-biased slide button slideable between two points, said spring having an enlarged coil in contactable engagement with said button at one of said points for producing an audible.

14. The spin casting fishing reel assembly as recited in claim 12 which further includes:
    - a carrier maintained within said casing and about said shaft;
    - a pin holder having a pin connected thereto for selective engagement with said fishing line;
    - a cam connected to said pin holder, said cam and pin holder being slidable upon said carrier and maintained upon opposite sides of said carrier from each other.

15. The spin casting fishing reel assembly as recited in claim 14 wherein an end of said inner tubular member is in juxtaposition to said cam.

16. The spin casting fishing reel assembly as recited in claim 15 which further includes a washer eccentrically maintained about said shaft and in juxtaposition to said pin holder.

17. The spin casting fishing reel assembly as recited in claim 11 wherein said brake comprises:
    - a housing fixedly secured to said pinion;
    - a first metal washer secured to the interior of said housing;
    - a second metal washer maintained within said housing and secured to said shaft; and a leather washer interposed between said first and second metal washers.

18. The spin casting fishing reel assembly as recited in claim 17 which further includes:
   a plug in friction-imparting engagement with said leather and metal washers;
   an adjustment rod in engagement with said plug; and
   a knob, axially aligned with said shaft and extending from said casting, said knob being in rotational engagement with said adjustment rod.

19. In a spin casting reel assembly having a spool received about a spool hub for receiving and maintaining fishing line, a carrier affixed to and rotatable with a carrier shaft passing through the spool hub, and a pin holder slidingly mounted upon the carrier and including a pin for selective engagement with the fishing line, the improvement, comprising:
   pin projecting means comprising a washer maintained in frictional sliding engagement about the spool hub and in selective contacting engagement with the pin holder for projecting the pin into engagement with the fishing line.

20. The improvement in a spin casting reel assembly as recited in claim 19 wherein said washer is an annular disc maintained in selective eccentric engagement about the spool hub.

21. The improvement in a spin casting fishing reel according to claim 8 wherein said knob extends from the casing at a rear portion thereof and rearwardly of an arc defined by the rotation of the crank, said knob being axially aligned with the shaft.

* * * * *